April 21, 1936.  H. T. WHEELER  2,038,092
METHOD OF DETERMINING THE PROPER PACKING
FOR A PARTICULAR INSTALLATION
Filed Dec. 3, 1931  3 Sheets-Sheet 1

INVENTOR.
Harley T Wheeler

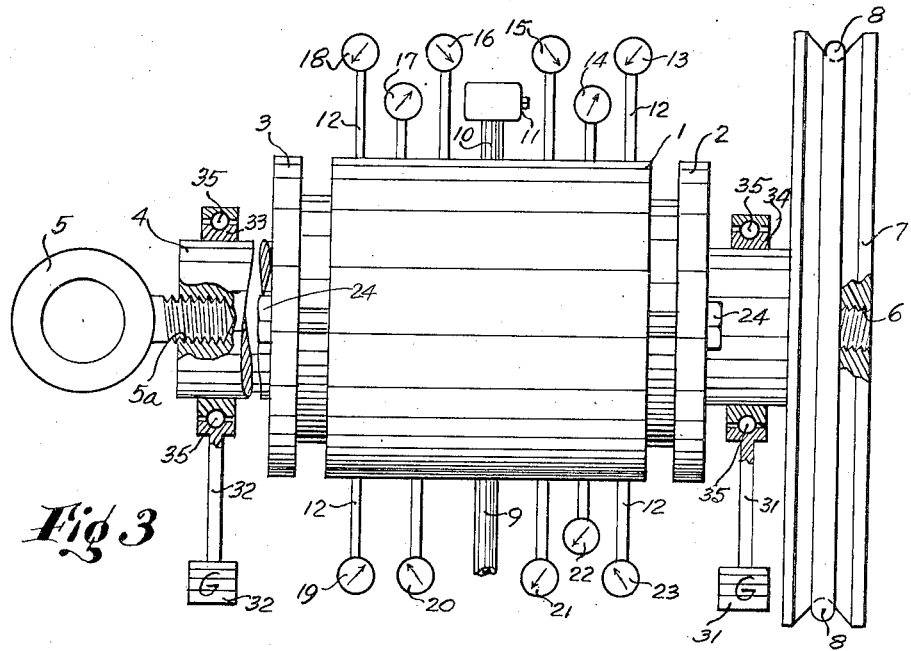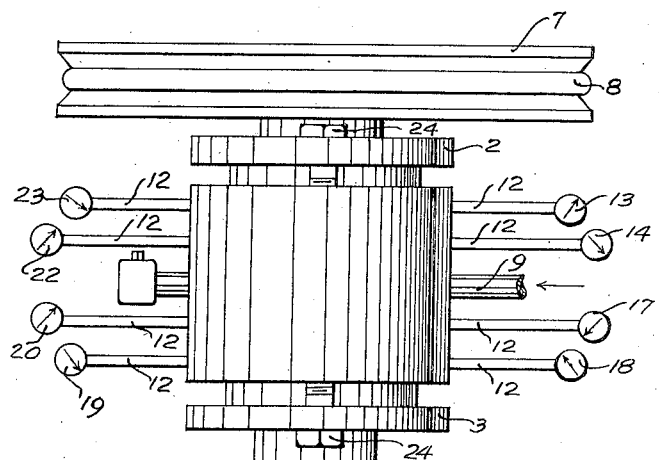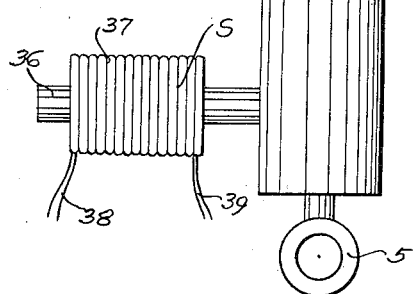

April 21, 1936.   H. T. WHEELER   2,038,092
METHOD OF DETERMINING THE PROPER PACKING
FOR A PARTICULAR INSTALLATION
Filed Dec. 3, 1931   3 Sheets-Sheet 3

INVENTOR.
Harley T Wheeler

Patented Apr. 21, 1936

2,038,092

UNITED STATES PATENT OFFICE 2,038,092

METHOD OF DETERMINING THE PROPER PACKING FOR A PARTICULAR INSTALLATION

Harley T. Wheeler, Dallas, Tex.

Application December 3, 1931, Serial No. 578,715

1 Claim. (Cl. 73—51)

This invention relates to methods of determining stress and corresponding strain within a porous structure made elastic by pressure, and the chief advantage lies in a capability of using friction readings between the porous body and a moving solid body to obtain the comparative relations.

Another advantage is that the correct width of a section may be determined.

One other advantage is that the correct length of a section may be determined.

Yet another advantage is that the friction due to saturation may be distinguished from that due to contact and the shape of the section.

Still another and important advantage is that the minimum possible strain corresponding to a given stress may be used to determine the dimensions of a section of the porous body.

With the foregoing objects and advantages in view, other desirable features will be disclosed during the description which follows, accompanied by the drawings, wherein:

Figure 3 is an elevational view of the testing machine arranged for testing bearing load on the packing.

Figure 4 is a vertical, external view of the testing machine arranged to test packing for vibration.

Figure 1:
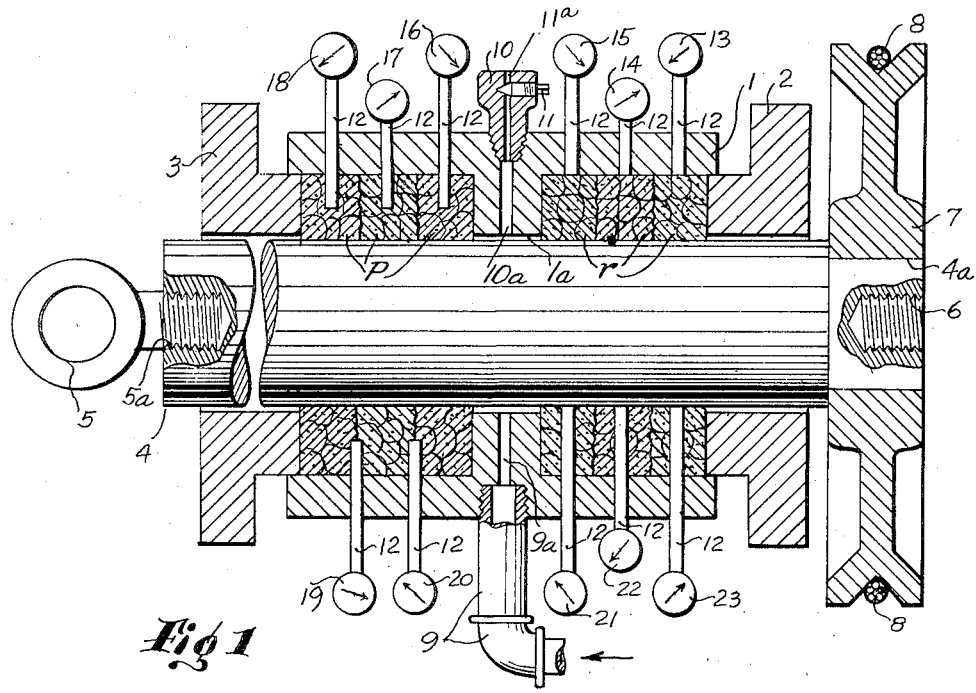
Figure 1 is a cross-section of a testing machine in which samples of porous elastic structures, such as rod packing, may be inserted for testing.
Figure 2:
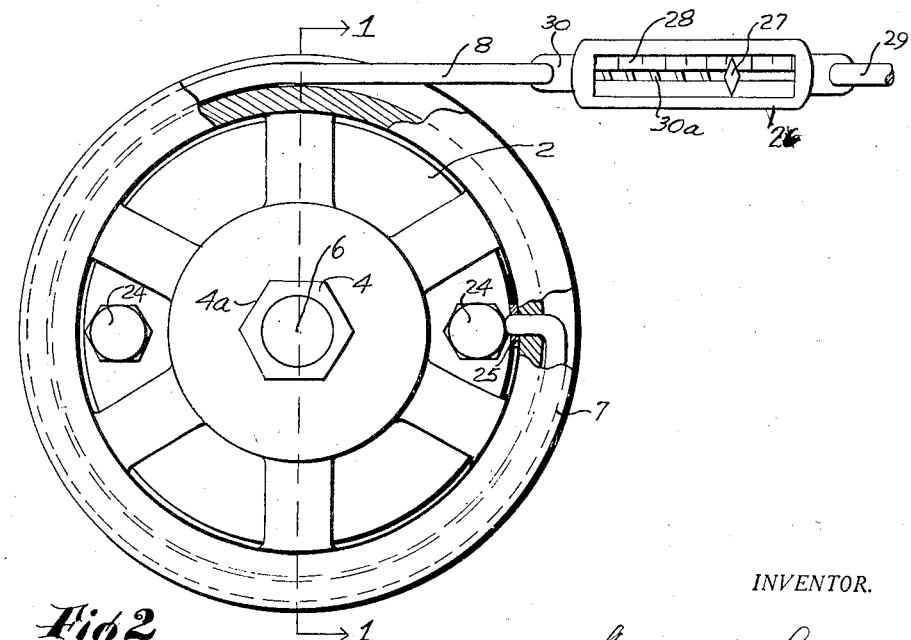
Figure 2 is an end view of the testing machine, as of Figure 1.
Figure 5:
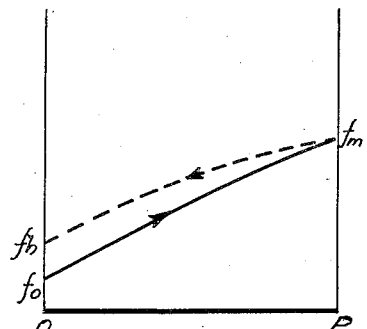
Figure 5 is a graphic curve showing the fluxion values of a single impression of pressure on a porous elastic structure.

Before discussing the stress-strain results as represented by Figures 5 to 8, a description of the testing machine follows. Referring now especially to Figure 1, the main frame 1 of the testing machine contains the stuffing-boxes, the partition 1a dividing them. The partition 1a has a clearance to admit the shaft 4, without contact. The packing glands 2 and 3 adjust the packing in the two stuffing-boxes and are adjusted by the cap screws 24, 24 also shown in the end-view, Figure 2. Returning now to Figure 1, the rod 4 is threaded internally on both ends at 5a and 6, so that an eye-bolt 5 may be attached. The pulley 7 is seated on the rod 4 by means of a hexagon shape 4a. The flexible rope 8 is attached to the pulley 7 and is used to rotate the rod assembly. As shown in Figure 2, the rope 8 is attached to the rim of the pulley 7 and is held to the latter by a clamp 25. This view also indicates the hexagon fit 4a on the end of the rod 4, fixing the pulley to the latter. The threaded hole 6 admits an eye-bolt for translation tests. To rotate the rod 4 and measure friction, the rope 8 is attached to the draw-bar 30 of the spring balance 26. The spring 30a is attached to the inside of the frame 26 and is compressed by a pull on the draw-bar 30. To the latter is attached a pointer 27 which indicates the pull on the spring 30a by means of a calibrated scale 28. The rope 29 is attached to the frame 26 and is connected to the source of movement.

Referring again to Figure 1, the partition 1a has a passage 9a into the clearance around the rod 4, the outer entrance of 9a being threaded to hold a piping assembly 9 to admit pressure from a suitable source. The passage 10a to the clearance around the rod 4 is threaded at its outer entrance to hold a valve body 10. The passage 10a is extended thru the body 10 by a passage 11a, a needle valve 11 being used to open or close the latter. A plurality of packing rings $p$, $p$, $p$ in one stuffing-box are alike and equal in number to the rings $r$, $r$, $r$ in the adjacent box, both sets being fitted and adjusted to suit the conditions under examination.

The sampling pipes 12, 12, 12 etc., are pushed into slightly tapering sockets in the frame 1, the inside and open ends of the pipes being positioned to measure internal pressures in the packing, or pressures at the surfaces adjacent to the packing. To the outer end of each pipe 12 is attached a dial gauge for measuring pressure. The gauges 13, 14 and 15 and the connected pipes 12 are positioned to measure the pressure at the stuffing-box wall, at the center of the periphery of each packing ring $r$, $r$, $r$. The gauges 16, 17 and 18 and the connecting pipes 12 are positioned to measure the pressure existing at the geometrical center of each annular packing ring $p$, $p$, $p$. The gauges 19 and 20 and the connecting pipes 12 are positioned to measure the pressure existing at the joints of the packing rings $p$, $p$, $p$. The gauges 21, 22, and 23 and the connecting pipes 12 are positioned to measure the pressure of the film existing on the rod surface, in the middle of each packing ring $r$, $r$, $r$. The foregoing dispositions are but examples of the method of investigating the internal pressures of a packing by sampling tubes directed to the desired points. Any kind of packing may be so investigated.

The testing machine shown in Figure 3 is an elevation of my testing device. The machine described up to this point will indicate the friction due to the pressure impressed on the packing plug by whatever effect the weight of the moving parts have, to wit, the shaft 4, the eye-bolt 5 and the pulley 7. As the latter three parts are light in weight in proportion to the effect of the applied pressure, investigation of weight or bearing thrust against the packing is made possible by the addition of the weights G, G placed on the standards 31 and 32. The downward pull of the weights G, G is transferred thru the bearing balls 35, 35 to the collars 33 and 34. The ball bearing suspension eliminates any tortional effect on the shaft 4 during rotation and maintains the weight in one position, the vertical.

Inasmuch as a bearing thrust is a dead weight in a given direction it is desirable in some cases to investigate the friction of packing devoid of all side thrusts. In Figure 4 is shown the testing machine, the rod 4 in a vertical position. The friction of the packing against the rod 4 will hold the latter in any position and its weight is so slight in comparison to the friction total that no thrust-taking surfaces are needed to locate the shaft in an endwise position.

The matter of vibration, of high or low pitch, is a bearing load of short duration of time. In Figure 4 is shown an arrangement for producing vibration in the rod 4. The assembly S is a solenoid composed of a coil of wire of turns 37 and with an iron core 36, which by position of the assembly S may be made to vibrate against the rod 4 by connecting the terminals 38 and 39 to a source of intermittent electric current. Arrangements are made at the source of current to vary the period of current reversals, the position of the assembly S with respect to the rod 4 varying the intensity of thrust.

The operation of testing packing with my invention is to insert the samples in the two stuffing-boxes and bring them to adjustment by the cap screws 24, 24. The pipes 12 are then inserted thru the openings in the main frame 1 and positioned in the various manners indicated in Figure 1, and as the particular test may require. Pressure is admitted thru the pipe assembly 9 and is confined to the machine by closing the needle valve 11 in the valve body 10. The pressures indicated by the gauges 13 to 23 inclusive are indicated with the shaft 4 in a condition of motion or of rest. To secure the friction of movement, a pull is made on the rope 29 of Figure 2. The spring 30a is compressed and the pointer 27 will indicate on the scale 28, a certain pull as the pulley 7 begins to move. When referred to the particular movement of the shaft, the pull indicated by the spring scale 28, together with the pressures indicated by the gauges 13 to 23 inclusive is sufficient information to determine the characteristics of the packing.

To determine the effect of a dead weight against packing, or to use the packing as a bearing, the arrangement shown in Figure 3 will indicate the change in characteristics when the packing reacts against the side thrust of the weights G, G. The pressures indicated by the gauges 19 to 23 will rise, while those of gauges 13 to 18 inclusive will fall. The pull indicated by the scale 28 of Figure 2 may or may not show a difference. If sufficient weights are added to G, G the packing rings will be deformed and the pressure will finally escape along the rod 4. The foregoing conditions when referred to the amount of the weights G, G, the speed of rotation of the shaft 4 and the pull indicated by the scale 28 are the determining factors of the characteristics of the packing as it is tested.

In testing packing for vibration it is desirable to eliminate all dead weight thrust, so as in Figure 4, the rod 4 is placed in a vertical position. The pull for rotation is made while the solenoid S is actuated by an intermittent electric current to a desired pitch and the position of the same solenoid S with respect to the rod 4 determines the thrust of the plunger 36. The pressures of the gauges 13 to 23 inclusive, together with the pull registered on the scale 28, as referred to the motion and the rate of movement of the shaft 4, are determining factors of the packing characteristics under the existing physical conditions.

While the foregoing methods of testing packing have been chiefly described as a means of determining the characteristics of rotation, it should be evident that oscillation and translation or any combinations of movements by the shaft 4 will give internal pressure readings and amounts of pull in character. It should also be evident that when any of the usual movements of rods, rotation, oscillation or translation are complicated by vibration, sudden or dead weight thrusts, sudden stopping and starting, temperature rise and fall, the change from liquids to gases against the packing, the introduction of grit and foreign matter into the packing, and the like, that this testing machine will accurately indicate the internal pressures and the friction reactions in character with the change of physical properties and the accompanying conditions.

The present invention relates to a method of determining the comparative stress of pressure and the strain of friction in porous or elastic bodies caused by pressure fluid, and particularly to the width, length and the volume of the porous structure is investigated to determine the design which will produce minimum friction and eventually leads to the creation of a packing ring which gives the theoretical minimum of friction, the exact shape however, being the subject of other applications for Letters Patent.

The present invention is one of a group of separate inventions which may be practiced and which are disclosed in my copending applications:

Serial No. 526,287, filed March 30, 1931, which relates to a machine for taking reactions of porous or elastic bodies under confinement and subjected to fluid pressure.

Serial No. 526,288, filed March 30, 1931, which relates to a method of determining the drop of pressure which occurs in a porous or elastic body under confinement and subjected to fluid pressure and the friction which is caused by the thrust due to the drop in pressure.

Serial No. 533,430, filed April 28, 1931, which relates to the method of determining the internal flow of a pressure fluid confined within a porous structure, which causes the increase or decrease of friction by a variation of the volume of the porous structure due to a change in the pressure impressed.

Serial No. 537,658, filed May 15, 1931, which relates to the method of determining the rate of internal flow of a pressure fluid confined within a porous structure which causes the increase or decrease of friction by a corresponding variation of the volume of the porous structure due to the impressing and releasing of pressure.

Using the definitions which have been established in my copending applications for Letters Patent and as before mentioned. The present investigation will be studied by a brief résumé of the fluxion chart, Figure 5. The ordinates are in terms of friction, measured by the testing machine of Figure 1, and the abscissas are pressures from o to P. The "initial set" of the sample is $O f_o$, the friction represented as rising in some proportion to the pressure increase to a value $f_m$. The reduction of pressure procures a friction indicated by the dotted line of final value $f_n$, showing a hysteresis value caused by saturation.

The study of variation in width and length is necessarily an advanced investigation of saturation, as the same contact surfaces are presupposed to be in effect. To obtain the variations of Figure 6, the testing machine of Figure 1 is arranged with a series of rods 4, maintaining the stuffing-box diameter a constant dimension. Or the rod 4 may be maintained a certain diameter and fitted to various sized stuffing-box bores. Either arrangement provides various packing widths which may be expressed in percentage of the rod diameter.

The herein described methods of comparing packing by relating the respective saturation values of various widths determines that the shape of a packing section is of little importance, unless the effect of the saturation is known. Claims that a certain shape will produce a desired sealing effect at the expense of a certain friction resistance have been found to be erroneous. Tests of a large number of braids, moulded rings and plastics with various lubricants have shown a striking similarity and are so closely related in reaction that the same width and length of contact will create approximately the same friction.

After the discovery that change of shape of ring sections when subjected to customary useage as may be reflected in my testing machine affected the friction but a slight amount, it was evident that data on the subject of packing friction was not complete, or that the subject was not understood. I learned that the factor of saturation is the necessary link for such a study and its values must be known for intelligent improvement of packing design. Saturation must be controlled and properly restricted before the true value of the ring shape may be determined or utilized.

The proper width of the packing and the necessary depth to produce minimum friction are the least understood relations of porous structures. The matter remained an enigma until internal-pressure readings were taken by the testing machine of Figure 1. It was learned that very wide packings produced a low friction but would hold little pressure. A decrease in the width held high pressures but at the expense of much friction. Also that very narrow packings had an excessive friction, but that the internal pressure varied with the impressed pressure and with little time lapse. The correct deduction was obvious; in certain widths the pressure was trapped in the pores and interstices, caused a tendency to increase the volume, forcing the packing against the rod, while a narrow width could only produce the high friction from accumulated thrust. As it was then discovered that for every rod diameter there were two widths which created the same friction, and one width which produced several times as much as the two lower levels, a further deduction was obviously called for, namely that a certain amount of saturation is necessary to offset the thrust of the impressed pressure. An interpretation of the foregoing deductions is, that at a given width pressure will permeate the porous structure and by creating a state of elasticity, create a minimum of friction. For excessive or deficient widths the elastic reaction is decreased, as may be further discovered by taking the fluxion values.

Figure 6:
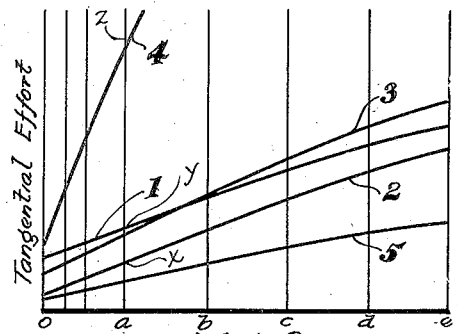
Figure 6 is a series of friction curves determined from variation of the width of a porous structure.

Referring now to Figure 6, a tangential effort and impressed pressure diagram. For an example, five packing widths are tested successively by rotating the rod at a constant rate, the same range of pressures being used on each width. Also for simplicity the friction created during the reduction of pressure is omitted. The ordinates in tangential effort, the latter being defined as the resistance to rotation per unit of area of the rotated surface, and is obtained from the direct pull on the rope 29 of Figure 2, the diameter of the rod 4 and the contact of the packing against the rod 4. The abscissas are pressures from O to $a, b, c, d$ and $e$. The packing sample number 1 is very narrow, numbers 2, 3, 4 and 5 each being wider than the preceding numbered sample.

Pressure is placed on each sample successively, starting with number 1, the narrowest, and so on to number 5 the widest. The tangential efforts calculated are plotted in the manner of Figure 6, and numbered 1, 2, 3, 4 and 5 which indicates the change of friction. It may be noted that number 2 is less than number 1, while number 3 is greater than 2 and 4 is the maximum. Number 5 shows less than any other width.

Figure 7:
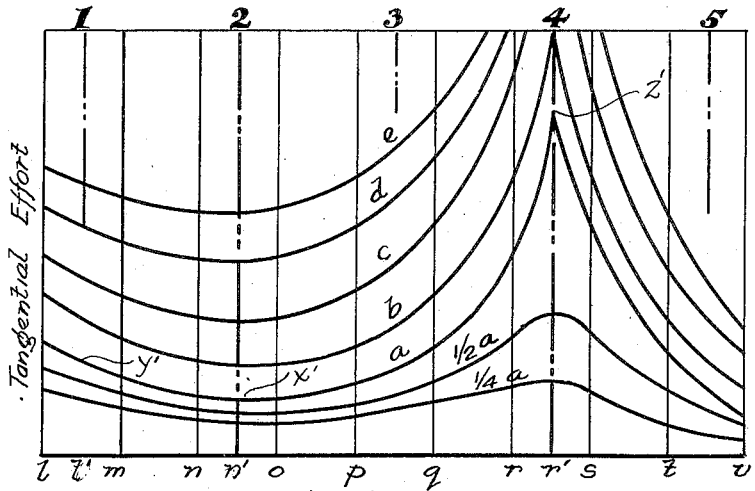
Figure 7 is a stress-strain diagram for determining the maximum and minimum widths of a section.

To obtain the charted variations over the entire range of tangential efforts and pressures in terms of the rod diameter, the stress-strain diagram of Figure 7 is derived from Figure 6. Stress is defined as the pressure impressed per unit of measurement, the values being $\frac{1}{4}a$, $\frac{1}{2}a$, $a, b, c, d$ and $e$, taken from Figure 6. Strain is defined as the friction expressed as tangential effort being the ordinates of Figure 6. The packing widths in units of measurement are plotted 1, 2, 3, 4 and 5 and are those widths of the samples 1, 2, 3, 4 and 5 used in Fig. 6. For interpolating the chart, other units of measurement are used being $l, m, n, o, p, q, r, s, t$, and $u$. To derive the curves of Figure 7, for example, three points on the stress-strain chart are shown $x', y'$ and $z'$. In Figure 6 points on curves 1, 2 and 4 which are intercepted by the pressure line $a$ are marked $x, y$ and $z$. Then in Figure 7, the tangential effort values $x, y$ and $z$ which were obtained from Figure 6 are transferred to a scale to the dimensional points $l', n'$ and $r'$, which correspond to the widths of the samples 1, 2 and 4, being the points $x', y'$ and $z'$. The curve so formed therefore indicates the change of effort caused by change of width. In like manner all the pressures from $\frac{1}{4}a$ to $e$ are plotted.

The deductions which follow are that at the dimension $n'$ the stress and strain are at a low value for all ranges of pressure, and to either side of that value are higher. At line $r'$ the stresses are highest for all pressure ranges. Packing wider than $r'$ decreases rapidly as to stress and strain, and it may be noted that the strain values at $t$ are equal to those at $n'$, the second width before mentioned.

The customary use of packing is to hold considerable pressure, therefore how much each width range can resist is of most importance. The dimension $r'$ will hold the highest pressures, but the friction is very high. Dimension $n'$ will hold high pressures with a reasonable friction. Dimension $t$ creates the same friction as $n'$ but holds about one-third the pressure of the latter. Dimension $u$ is very low in friction but leakage begins to appear around the box walls.

No attempt herein is made to specify the dimensions which have been found in actual practice. The intent of this specification is to record the fact that the width of packing is a factor of saturation and of great importance in designing packing shapes and estimating friction.

To vary the width of packing is to change the area exposed to the pressure. Then when the depth of the porous body is considered, it is found that it is the volume which actually regulates the effect of saturation. The reactions to pressure which take place in porous structures occur only when they are confined in spaces. When annular packing rings are considered, the box wall and the rod surfaces form two parallel surfaces and the packing gland face a third, these three forming a cup-like retainer, all points on which the packing presses with varying intensity. Against the fourth wall, the bottom of the box, packing is usually adjusted to touch, and it is the usual belief that the operation of adjustment accomplishes this. It is also the usual belief that the pressure impressed compresses the packing and causes an open space to occur between the bottom of the box and the packing.

That these beliefs are erroneous is proven by research on saturation. The higher the pressure, the tighter the packing is compressed against all of the walls including the bottom of the box, due to the tendency of a porous structure to occupy a larger volume. Yet this action of expansion must occur to a certain extent, for if the packing is loose in the box (not touching the bottom wall) the pressure will leak out along the rod and box wall surfaces. Therefore it is obvious that saturation is desirable and necessary, but its control and restriction to certain paths is also necessary to prevent high friction and to prolong the life of the structure. Before drawing definite conclusions for this specification, further actions of saturation are studied.

It has been found for example, that if two inches in length of contact surface are necessary to hold a pressure on the contact adjacent to the moving surface, the length against the wall surface should also be two inches. If the stationary surface length is increased beyond that which is necessary for the moving surface, saturation will increase in proportion to the relative volumes and the friction increase will be about in the same ratio. Then again if two inches length is necessary to seal the box wall, if the moving contact length is made less, a higher friction will be found due to the necessity of excessive gland pressure to seal the joint, meaning excessive compression of the structure. Referred to contact length, the minimum saturation for any width between parallel surfaces is obtained when the surfaces contacting against moving and stationary planes are equal in length. In terms of the friction of contact, the twenty fifth law is written:

25. For any width of a porous elastic structure, the minimum saturation obtains when the length of the stationary and moving contacts between parallel surfaces are equal in length.

When considering the saturation effect of the volume of a set of annular packing rings, the study of Figure 7 indicates that there are two width ranges which may be chosen with the same friction. The width dimension $n'$ has been found to be practical for rod sizes of $\frac{7}{8}''$ and larger, while the dimension $t$ is best for $\frac{11}{16}''$ and smaller, these considerations being affected by practical troubles in the manufacture of narrow width packings. The explanation of the application of these results are shown in Figure 8, the ordinates being in percentage of rod diameter from zero to 100, and the abscissas in dimensional units A, B, C and D.

Figure 8:
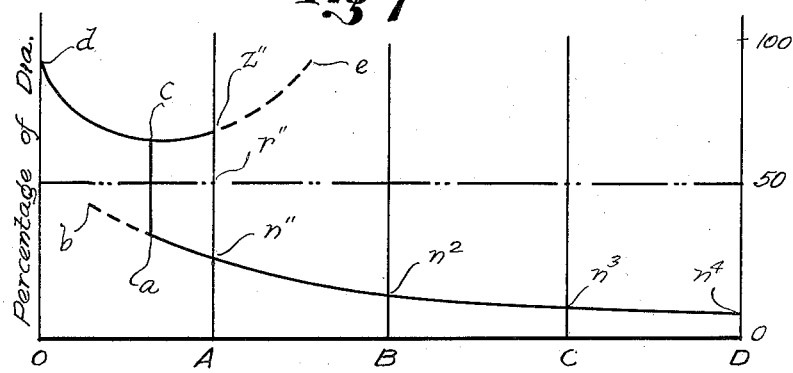
Figure 8 is a chart of section widths plotted in terms of the diameter of a moving body.

The derivation of Figure 8 is as follows: The dimension $n'$ of Figure 7, being the dimension width of minimum friction for a given rod diameter expressed in terms of the percentage of that rod diameter, and plotted on Figure 8 as $n''$ for the diameter A. $r''$ and $t''$ are derived in like manner for the diameter A. Then for diameters B, C and D, the values $n$, $r$ and $t$ are secured by a repetition of the process required to secure Figure 7 for the diameters selected.

Investigation has shown that the maximum strain falls close to fifty percent of the rod diameter as at $r''$, Figure 8. The range from $\frac{7}{8}''$ and larger is easily determined, but less than $\frac{7}{8}''$ diameter requires the elimination of several factors to choose a satisfactory width. At $\frac{5}{8}''$ diameter, represented by $a$, for example, either 40 or 60 per cent of the diameter is satisfactory, but less than $\frac{5}{8}''$ diameter, packing cannot be satisfactorily made, as represented by curve $ab$, the value $cd$ being preferable. From $\frac{5}{8}''$ to $1''$, for example, the curves $n''a$ or $ct''$ are equally satisfactory, but larger than $1''$, the relation $t''e$ is not desirable due to leakage around the box wall.

Figure 8 may be called the curves of minimum volumetric saturation, comprising the upper and lower curve. For practical and general usage these curves may be derived by taking the averages of several kinds of packing. Each kind has a distinctive curve, but as packing is manufactured the porosity and density varies but little, so that an average empirical curve may be secured. It should be obvious that the lower curve is chosen at a width having the minimum saturation in the range up to fifty percent of rod diameter, and therefore the seepage flow is at the highest rate. Therefore for any one kind of a porous structure the following law may be written:

26. The minimum volumetric saturation of packing widths within the range of fifty percent of the rod diameter obtains at that width having the highest seepage flow.

This study of saturation is important in designating what are correct widths. The actual results of this investigation may be taken for a guide in designing new machinery and are also very important in devising methods which will mitigate to a large extent the errors of relation which are already in use and for which packing must be furnished. The subject of these special constructions is continued in other applications for Letters Patent, nothing herein being claimed.

The methods of applying these relations of saturation may be widely used, and such as are included in the appended claim, are construed to be the spirit of this invention.

I claim:

A method of determining the proper packing for a given installation including confining packing rings of a predetermined width under pressure in a closed casing about a shaft, exerting a fluid pressure in such casing, moving the shaft relative to such casing and determining the fluid pressures at various points in the packing, noting the force required to move the shaft, making similar tests with packings of a different width and length and from the information thus obtained determining the proper packing from the relationship between the width and length of the packing tested and the resistance to rotation caused thereby.

HARLEY T. WHEELER.